US012227218B1

(12) United States Patent
Clarke et al.

(10) Patent No.: US 12,227,218 B1
(45) Date of Patent: Feb. 18, 2025

(54) CART LIFT ROBOTIC TRANSPORT

(71) Applicant: Amazon Technologies, Inc., Seattle, WA (US)

(72) Inventors: David Clarke, Lafayette, CO (US); Danny Sekich, Berthoud, CO (US); Michael Bolotski, Seattle, WA (US); Phillip Walkemeyer, Westminster, CO (US); Wesley Caruso, Louisville, CO (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 17/705,817

(22) Filed: Mar. 28, 2022

(51) Int. Cl.
| | | |
|---|---|---|
| *B66F 9/06* | (2006.01) | |
| *B62B 5/00* | (2006.01) | |
| *B66F 9/065* | (2006.01) | |
| *B66F 9/075* | (2006.01) | |
| *B66F 9/18* | (2006.01) | |
| *B66F 9/24* | (2006.01) | |

(52) U.S. Cl.
CPC ............ *B62B 5/0079* (2013.01); *B66F 9/063* (2013.01); *B66F 9/065* (2013.01); *B66F 9/0755* (2013.01); *B66F 9/18* (2013.01); *B66F 9/24* (2013.01)

(58) Field of Classification Search
CPC ....... B62B 3/06; B62B 3/0625; B62B 3/0631; B62B 3/0612; B62B 3/0618; B66F 9/065; B66F 9/063
See application file for complete search history.

(56) References Cited

U.S. PATENT DOCUMENTS

| | | | | |
|---|---|---|---|---|
| 2,511,073 | A | * | 6/1950 | Mccandless .......... B62B 3/0625 254/10 C |
| 2015/0166314 | A1 | * | 6/2015 | Xu ........................ B62B 3/0625 254/9 C |
| 2016/0368747 | A1 | * | 12/2016 | O'Connell .............. B66F 9/065 |
| 2018/0057032 | A1 | * | 3/2018 | Brewer .................. B62B 3/0631 |
| 2020/0307667 | A1 | * | 10/2020 | Tang ....................... B66F 9/24 |
| 2021/0232148 | A1 | * | 7/2021 | Sui .......................... B66F 9/063 |
| 2022/0144609 | A1 | * | 5/2022 | Yamamoto ............. G05D 1/646 |
| 2022/0250886 | A1 | * | 8/2022 | Chintalapallipatta ........................ B66F 9/0755 |
| 2023/0252409 | A1 | * | 8/2023 | Martin, Jr. ............. G06Q 10/08 705/28 |
| 2023/0348248 | A1 | * | 11/2023 | Yamamoto ........... G05D 1/0225 |
| 2024/0067510 | A1 | * | 2/2024 | Ulbrich ................ G05D 1/0253 |

* cited by examiner

*Primary Examiner* — Kaitlin S Joerger
(74) *Attorney, Agent, or Firm* — Eversheds Sutherland (US) LLP

(57) ABSTRACT

Autonomous mobile robots for transporting carts are described. An example robotic cart transport system includes a cart for transport and a robotic transport. The robotic transport includes a transport cab and a load handler. The transport cab includes a drive system and a sensor array positioned over the transport cab. The load handler includes a load base supported by a directable caster wheel, a lift table positioned over the load base, a lift abutment anchor, and a lift drive. The robotic transport can autonomously position the load handler under a cart, and the lift drive can raise the lift table up and off of the top surface of the load base, to a lifted position seated against the lift abutment anchor. The lift table will contact and lift the cart in this motion, and the cart can be transported to a new location by the robotic transport.

20 Claims, 14 Drawing Sheets

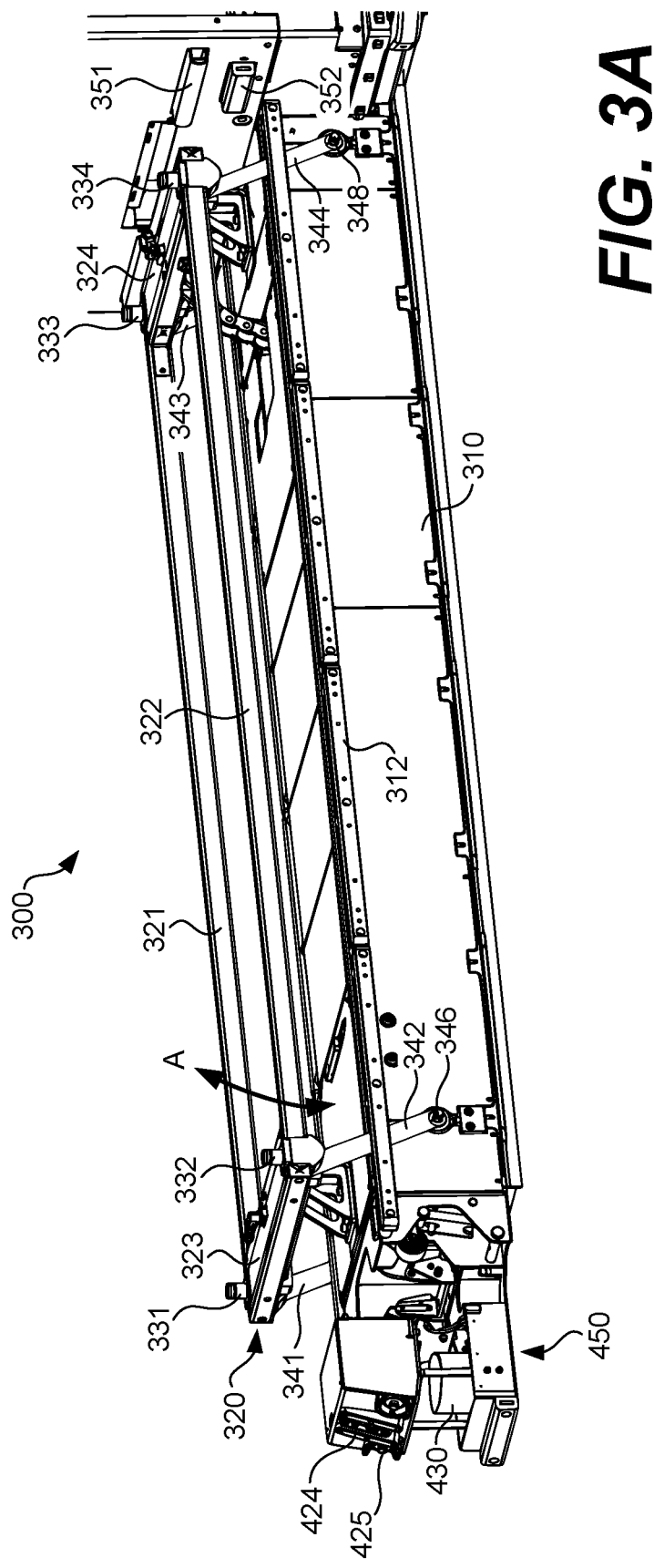

CART LIFT ROBOTIC TRANSPORT

BACKGROUND

Thousands of items, articles, or products can be stored at materials handling facilities. These items can be stored at many different locations in the materials handling facilities. It is necessary to transport the items from place to place within the materials handling facilities, as items are consolidated for orders to ship and new items are introduced to the facilities for restocking. To that end, many different types of materials handling equipment and systems, including conveyor systems, chutes, carts, robotic systems, and other equipment is often relied upon to facilitate the movement and transport of items within materials handling facilities.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIG. 3A illustrates a load handler of the robotic transport shown in FIG. 2 according to various aspects of the embodiments of the present disclosure.

DETAILED DESCRIPTION

As noted above, thousands of items, articles, or products can be stored at materials handling facilities. These items can be stored at many different locations in the materials handling facilities. It is necessary to transport the items from place to place within the materials handling facilities, as items are consolidated for orders to ship and new items are introduced to the facilities for restocking. To that end, many different types of materials handling equipment and systems, including conveyor systems, chutes, carts, robotic systems, and other equipment are often relied upon to facilitate the movement and transport of items within materials handling facilities.

Additionally, more and more items are being shipped to consumers from materials handling facilities. It has become more important to bring efficiency to the distribution chains through which these items are being transported. Additionally, it has become important to carefully track and monitor the schedules by which these items are transported, to ensure compliance with the expectations of and commitments to the consumers. Because a great number of items are processed at and pass through materials handling facilities and sort centers, it would be helpful to further automate the transportation and consolidation of the materials handling processes in these facilities.

A number of different systems have been developed to help automate the transport, organization, and handling of items in a materials handling facility or sort center. Conveyor systems, robotic automation machines, vacuum and gripping systems, and other systems have been designed to provide increased productivity through the automation of materials handling tasks.

In the context outlined above, new types of autonomous mobile robots for transporting carts are described herein. In one example, a robotic cart transport system includes a cart for transport and a robotic transport. The robotic transport includes a transport cab and a load handler. The transport cab includes a drive system and a sensor array positioned over the transport cab. The load handler includes a load base supported by a directable caster wheel, bumper rails that extend along sides of the load base, a lift table positioned over the load base, a lift guide linkage pivotally secured between the load base and the lift table, a lift abutment anchor, and a lift drive. The robotic transport can autonomously position the load handler under a cart, and the lift drive can raise the lift table up and off of the top surface of the load base, to a lifted position seated against the lift abutment anchor. The lift table will contact and lift the cart in this motion, and the cart can be transported and lowered to a new location by the robotic transport.

Figure 1:
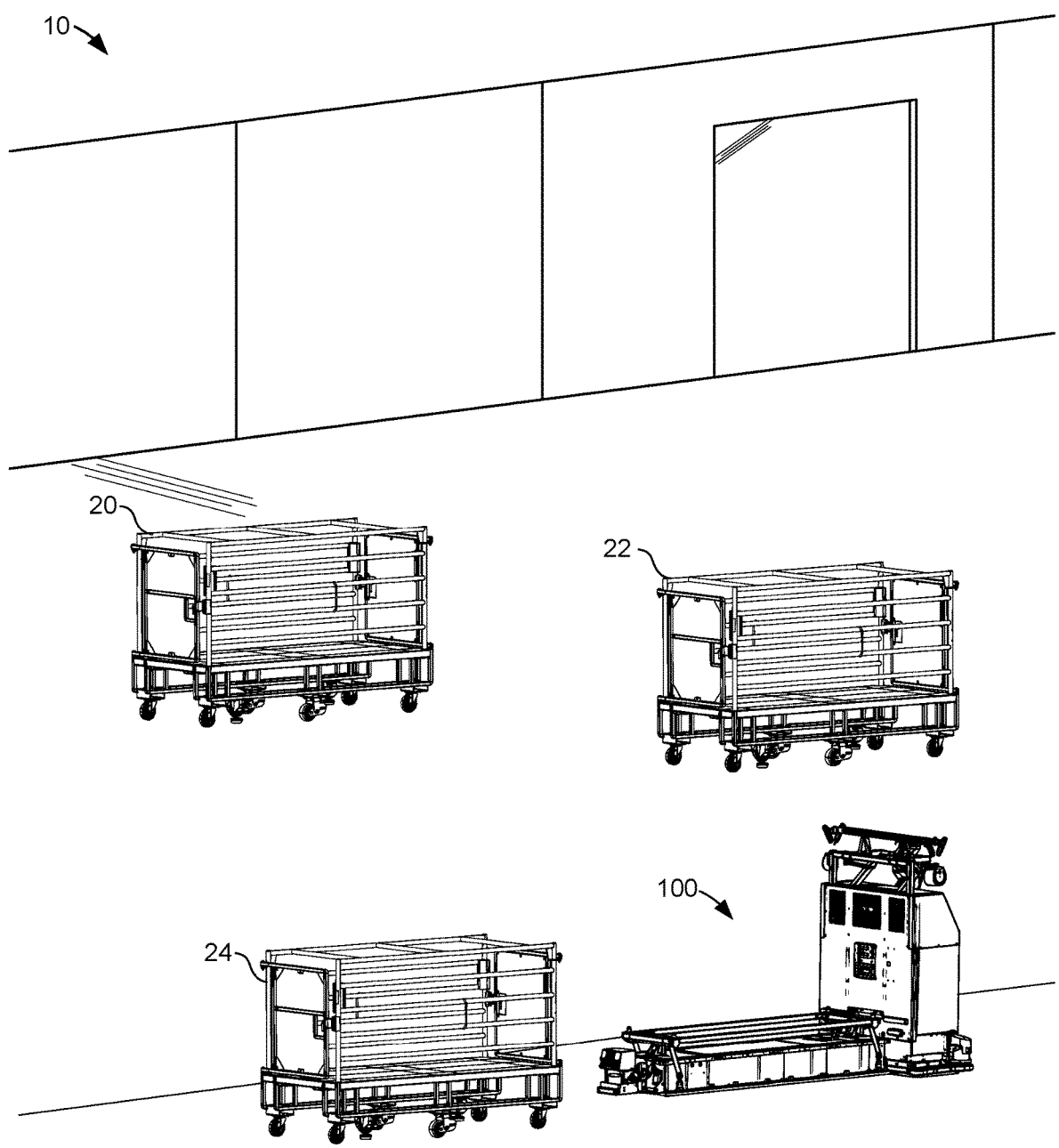
FIG. 1 illustrates an example materials handling facility according to various aspects of the embodiments of the present disclosure.

FIG. 1 illustrates an example materials handling facility 10 according to various aspects of the embodiments. Among other materials handling equipment and systems, the materials handling facility 10 includes carts 20, 22, and 24, and a robotic transport system 100 (also "robotic transport 100"). The robotic transport 100 is an example of an autonomous mobile robot, and it is capable of lifting and transporting the carts 20, 22, and 24 to among various locations in the materials handling facility 10.

The materials handling facility 10 is provided as an example environment or facility in which one or more robotic transports, such as the robotic transport 100, can be implemented to automate materials transport and handling tasks. The materials handling facility 10 can include several other automation tools and systems that are not shown in FIG. 1, such as autonomous mobile robots, conveyor systems, chutes, robotic arms and other automation systems, vacuum and gripping systems, and other systems. In practice, the robotic transports and systems described herein can be implemented to assist with a number of different tasks at various locations in materials handling facilities.

The robotic transport 100, as shown in FIG. 1, is a representative example of an autonomous mobile robot. Among other uses, the robotic transport 100 can be relied upon to transport carts, such as the carts 20, 22, and 24, among others, to various locations within the materials handling facility 10. Like the robotic transport 100, the carts 20, 22, and 24 are illustrated as representative examples. The robotic transport 100 is not limited to transporting any particular shape, size, type, or style of cart, carrier, or related transport equipment. The cart lift robotic transport systems described herein can transport, and be extended to transport, various types of carts and carriers for materials transport and handling. The robotic transport 100 can also be used in other types of materials handling environments and for other purposes as compared to the examples described herein.

The carts 20, 22, and 24 can be relied upon to transport items in the materials handling facility 10. One example of the carts 20, 22, and 24 is described below with reference to FIGS. 4A and 4B. The carts 20, 22, and 24 can secure and carry a number of items, packages, parcels, or other materials, for transport. The carts 20, 22, and 24 include wheels to facilitate the transport of items, and the carts 20, 22, and 24 can roll within the materials handling facility 10. The carts 20, 22, and 24 are not motorized or driven, however, and must be moved (e.g., pushed, pulled, etc.) manually by individuals or other robotic systems. In that context, a number of cart lift robotic transport systems are described herein, and the robotic transport 100 is one example of such a transport system.

In FIG. 1, the robotic transport 100 is positioning itself to lift the cart 24, as part of an autonomous process for transporting the cart 24 to a different location within the materials handling facility 10. As described in further detail below, a load handler of the robotic transport 100 can tunnel (e.g., extend itself in part) under and lift the cart 24 using a lift table. The lift table includes a number of lifting pins or pillars, which interlock into recesses under the cart 24, as the cart 24 is lifted. Once lifted for transport, the cart 24 is securely seated over the lift table. The robotic transport 100 includes a number of sensors positioned at one or more corners, ends, and around the sides and top of the cart 24. The robotic transport 100 can rely upon image, radar, light detection and ranging (LIDAR), and other sensors to safely lift and transport the cart 24 within the materials handling facility 10.

The robotic transport 100 offers several advantages. The robotic transport 100 is particularly designed to transport carts, carriers, or related equipment safely and reliably. The robotic transport 100 is capable of lifting the cart 24 securely, without (or nearly without) tilting, shaking, or disturbing the cart 24 or the contents within the cart 24. The sensors of the robotic transport 100 are also placed at positions to monitor all sides around the robotic transport 100 for obstacle avoidance. These and other features of the robotic transport 100 are described below.

Figure 2:
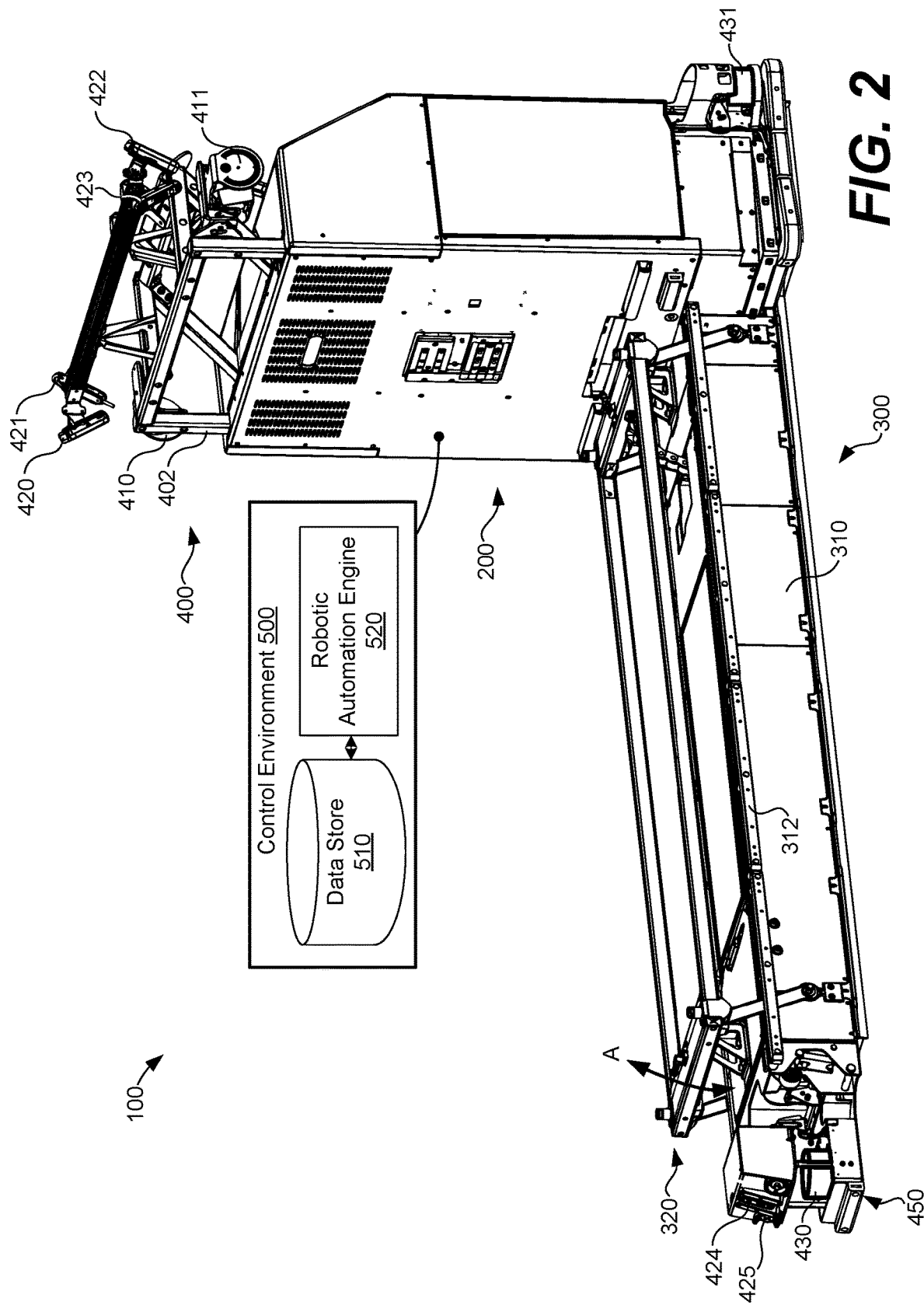
FIG. 2 illustrates a cart lift robotic transport according to various aspects of the embodiments of the present disclosure.

FIG. 2 illustrates the robotic transport 100 according to various aspects of the embodiments of the present disclosure. The robotic transport 100 is provided as a representative example in FIG. 2, to convey the concepts of cart lift robotic transports for moving and repositioning carts and other materials handling equipment. The robotic transport 100 is not drawn to any particular scale, and the robotic transport 100 can range in size and dimensions, as needed for the implementation. Overall, the structural components of the robotic transport 100 can be embodied using a range of suitable materials, including a combination of metal, plastic, composite, or other bar, tube, rail, and sheet stock, rubber, wood, combinations thereof, and other materials, without limitation to any particular materials. The robotic transport 100 can be assembled together with a range of suitable mechanical fasteners, including screws, bolts and nuts, welds, rivets, adhesives, pins and interlocks, mechanical interferences, and other suitable fastening means, without limitation to any particular fastening solutions.

As shown, the robotic transport 100 includes a transport cab 200, a load handler 300, an upper sensor array 400, a handler sensor array 450, and a control environment 500, among other components. However, the concepts described herein do not require all of the components shown in FIG. 2 in all cases. For example, one or more components of the transport cab 200, the load handler 300, the upper sensor array 400, or other components can be replaced, repositioned, or omitted as compared to that shown in the illustrations.

The transport cab 200 can be embodied as a housing and support structure for the control environment 500, the main drive system of the robotic transport 100, the upper sensor array 400, one or more batteries of the robotic transport 100, and other systems of the robotic transport 100. The drive system and other components of the transport cab 200 are described in greater detail below with reference to FIG. 3G.

Among other components, the load handler 300 includes a load base 310, bumper rails 312 that extend along top corners or edges of the load base 310, and a lift table 320. The lift table 320 is designed to lift a cart, so that the cart can be transported by the robotic transport 100 to another location. The lift table 320 is illustrated in a raised position in FIG. 2, but the lift table 320 can also rest upon the top of the load base 310 as described below.

With the lift table 320 resting on the load base 310, the robotic transport 100 can maneuver the load handler 300 underneath a cart for transport, such as under one of the carts 20, 22, or 24 shown in FIG. 1. The load handler 300 is designed to have dimensions small enough to permit a mechanical clearance between the load handler 300 and an open channel between wheels of the cart for this purpose. The cart can also be designed for this clearance. Thus, the control environment 500 can direct the main drive system of the robotic transport 100 to slide or tunnel the load handler 300 underneath the cart, such as between wheels of the cart, using operational feedback data from the upper sensor array 400, the handler sensor array 450, and possibly other sensors and other operational data. The bumper rails 312 can facilitate this sliding or tunneling, by providing surfaces for incidental contact with structural features under the cart, as the load handler 300 is extended and tunnels under the cart.

With the load handler 300 positioned under the cart, the robotic transport 100 can actuate a lift drive, as described below with reference to FIGS. 3E and 3F. The lift drive is capable of raising the lift table 320 up and off of the top of the load handler 300, in the direction "A" shown in FIG. 2. As it is raised, the lift table 320 will contact the underside of the cart, and the cart will be lifted, with the cart resting upon the lift table 320. The wheels of the cart will also be lifted off the ground as part of this lifting motion, so that no parts of the cart are contacting the ground. Mechanical interferences or interlocks between features of the lift table 320 and the underside of the cart can help to maintain the cart in a secure position over the robotic transport 100. These features are described below with reference to FIG. 4B.

Once a cart is lifted, the robotic transport 100 can autonomously navigate to a new location, repositioning the cart with it. Once the cart has been transported to the new location, the lift drive can lower the lift table 320. The lift table 320 will then lower back down to a position resting upon the top of the load handler 300. The wheels of the cart will contact the ground again as part of this lowering motion. The mechanical interferences or interlocks between the lift table 320 and the underside of the cart will also be released as part of this lowering motion, and a clearance will again exist between the cart and the robotic transport 100. The robotic transport 100 can then autonomously navigate itself, to pull the load handler 300 out from underneath the cart, leaving the cart at the new location.

The upper sensor array 400 includes a support frame 402, with a number of sensors mounted and positioned on the support frame 402. The support frame 402 can be formed from any suitable materials, such as metal or plastic tubing or rods, among other structural supports. A number of different sensors of the sensor array 400 are secured at various locations about the support frame 402, among other locations on, in, and around the robotic transport 100. Example locations are shown in FIG. 2, although any suitable positions can be used. The support frame 402 allows the individual sensors of the sensor array 400 to be positioned at many different locations and orientations, so that the front, back, and sides of the robotic transport 100 can be evaluated using the sensor array 400.

The sensor array 400 can include one or more cameras, radar systems, LIDAR systems, optical sensors, and other sensors and systems that provide the data needed for computer-based image and vision processing. Other sensors of the robotic transport 100 can include pressure, contact, optical, or vision-based sensors, to detect a number of different operating parameters of the robotic transport 100. In other examples, the sensors can be embodied as position encoders that provide absolute or relative position information related to drive motors. The cameras can include one or more charge-coupled device (CCD) image sensors, active-pixel complimentary metal-oxide semiconductor (CMOS) image sensors, or other image sensor arrays capable of capturing images and distinguishing depth. In one example, the cameras can include Intel® RealSense™ cameras, capable of depth tracking data collection. The data captured by the sensor array 400 and other sensors can be stored and processed by the control environment 500, as described below. The control environment 500 can use the data, in part, to direct the operations of the robotic transport 100.

In the example illustrated, the sensor array 400 includes image sensors 421-423 and LIDAR sensors 410 and 411, among other sensors secured on the support frame 402. The sensor array 400 is provided as a representative example in FIG. 2, and other arrangements of sensors can be relied upon. The relatively high positions of the sensors in the sensor array 400 provide a good vantage point for object avoidance and route planning over relatively large distances. The robotic transport 100 also includes a LIDAR sensor 431 positioned at the front, bottom corner of the transport cab 200 in the example shown, and a similar radar sensor can be positioned at the other front corner of the transport cab 200. It should be noted that although sensors 410, 411, and 431 are represented as LIDAR sensors, in some embodiments, one or more of sensors 410, 411, and 431 can comprise radar sensors.

The handler sensor array 450 includes an image sensor 424, an image sensor 425, a LIDAR sensor 430, and possibly other sensors. The relatively low positions of the sensors in the handler sensor array 450 provide a good vantage point for capturing image data for tunneling under carts, as the image sensor 424, the image sensor 425, and the LIDAR sensor 430 can evaluate the structural features, fiducials, and other features under carts, to direct tunneling motion. The image, radar, and other operational feedback data gathered by the sensors of the sensor array 400, the handler sensor array 450, and other sensors of the robotic transport 100 can be relied upon for computer-based image, vision, and point cloud processing, for cart alignment and onboarding, for example. For example, the data gathered by the image sensor 424 can be used for optical detection while the data gathered by the sensor 425 can be used for localization. The robotic transport 100 can also include a number of human-machine interface buttons, such as panic or stop buttons, resume buttons, and other human-machine interface buttons.

The robotic transport 100 can also incorporate other sensors, such as weight sensors, position sensors, position encoders, interlock sensors, and other sensors within the drive systems, latching and catching assemblies, and other components. The operational feedback data from all the sensors in the robotic transport 100 can be stored and processed by the control environment 500.

The control environment 500 can be embodied as a control system for the robotic transport 100, including one or more processors, processing devices, circuits, and memory devices. The control environment 500 can be implemented using a combination of hardware and software, for example, as described in further detail below with reference to FIG. 7. The control environment 500 can be implemented as an embedded control system of the robotic transport 100 itself (e.g., a programmable logic controller (PLC) of the robotic transport 100), implemented separate from the robotic transport 100, or be embodied as a hybrid of local and remote processing systems. The control environment 500 can interface with the electromechanical and sensor systems of the robotic transport 100 in any suitable way, such as through one or more local interfaces, wired or wireless network interfaces, or other suitable interfaces. Additionally, the control environment 500 can include one or more network interfaces for data communications, including wireless network interfaces for data and control communications with other computing environments and systems within the materials handling facility 10, for example.

The control environment 500 is configured to direct the overall operation of the robotic transport 100 in the automated transport of carts within the materials handing facility 10. In that sense, the control environment 500 is configured to direct the drive, wheel, and lift systems of the robotic transport 100, among other electromechanical systems. The control environment 500 is also configured to direct the operation of the sensors of the robotic transport 100, gather operational feedback data from the sensors, process the data, and direct the drive systems of the robotic transport 100 based on the data.

The control environment 500 includes a data store 510 and a robotic automation engine 520. The data store 510 can store operational data for the robotic transport 100. For example, the data store 510 can store route data, cart data, sensor data, operational status data, and other system operation and telematics data, among other types of data. The data store 510 can also store operational feedback data generated by the sensor array 400, the handler sensor array 450, and other sensors of the robotic transport 100. The data in the data store 510 can be processed by the robotic automation engine 520, as part of one or more command and control algorithms for the operation of the robotic transport 100. Example control operations of the robotic automation engine 520 are described in further detail below.

Figure 3B:
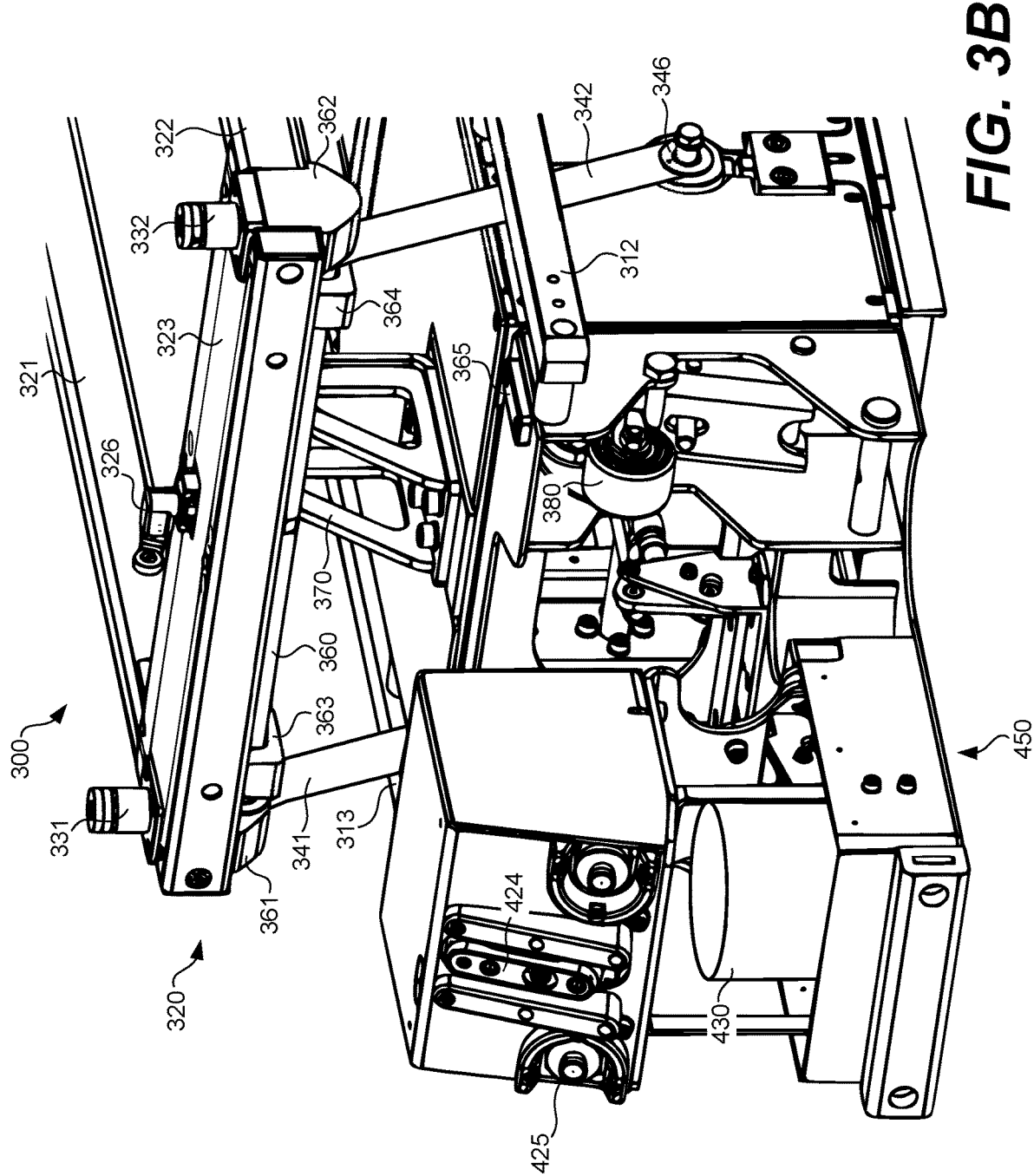
FIG. 3B illustrates one end of the load handler shown in FIG. 3A according to various aspects of the embodiments of the present disclosure.
Figure 3C:
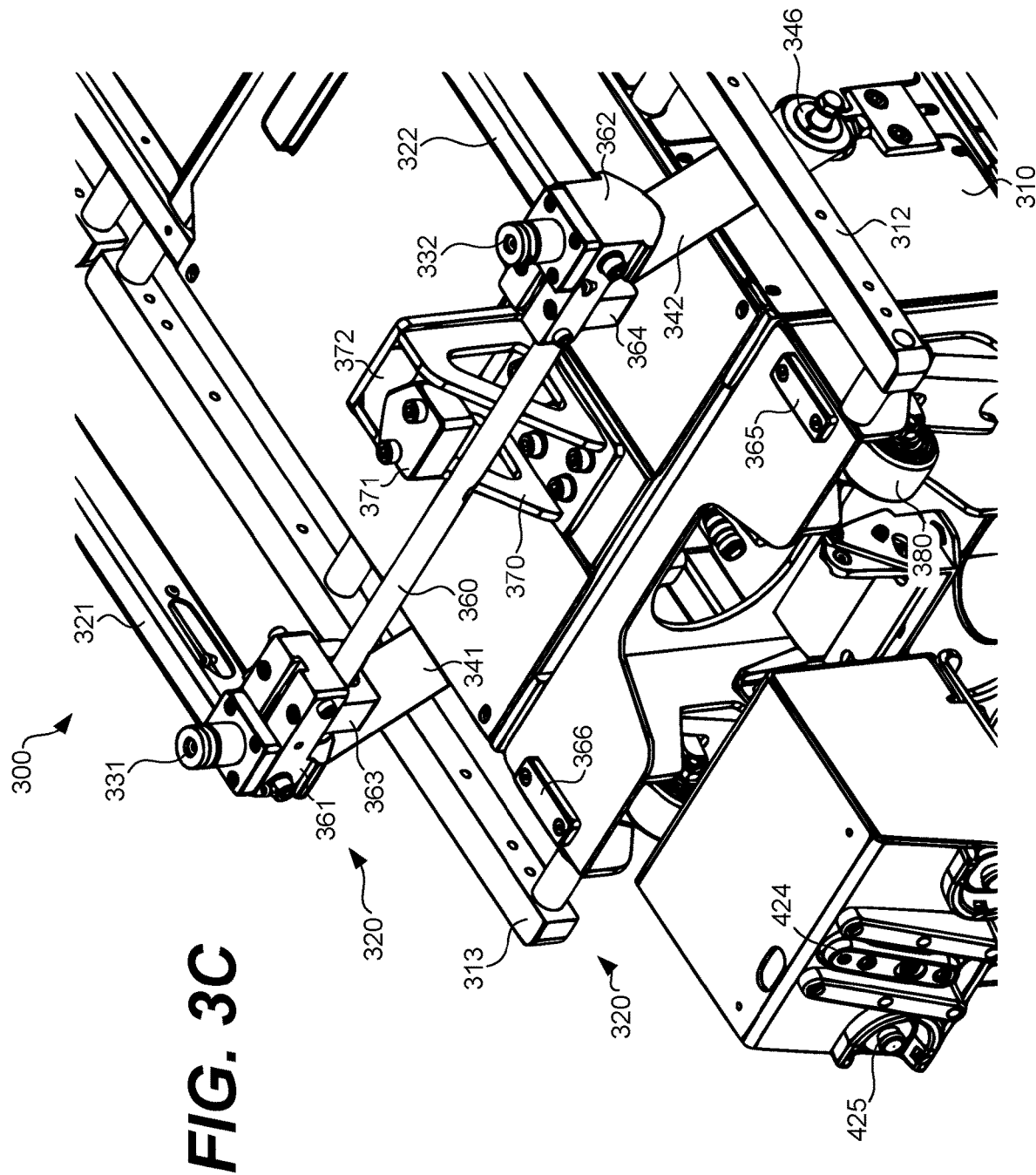
FIG. 3C illustrates another view of the end of the load handler shown in FIG. 3B according to various aspects of the embodiments of the present disclosure.
Figure 3D:
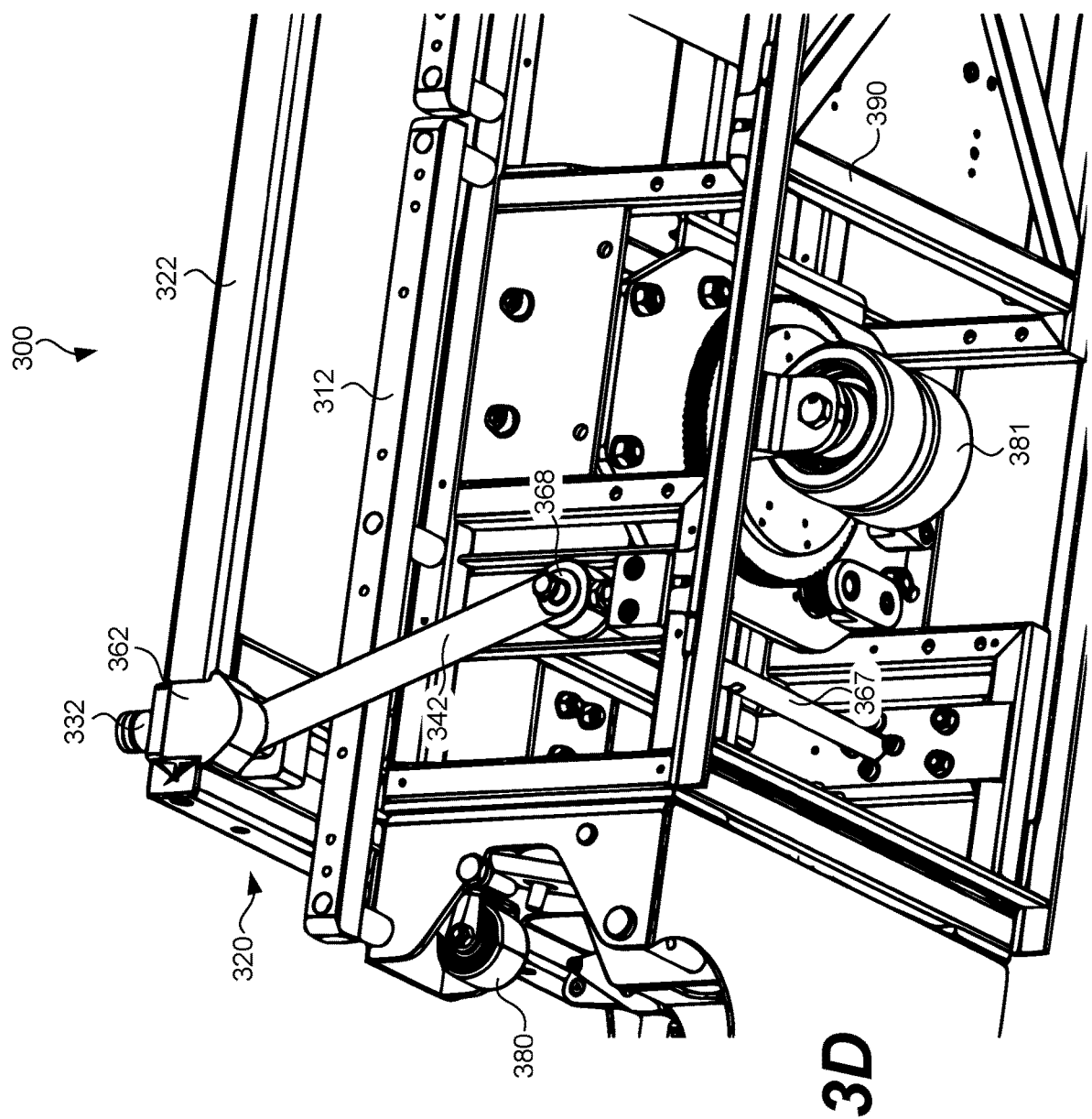
FIG. 3D illustrates an underside view of the end of the load handler shown in FIG. 3B according to various aspects of the embodiments of the present disclosure.

Turning to other aspects, FIG. 3A illustrates the load handler 300 of the robotic transport 100 shown in FIG. 2. FIG. 3B illustrates a closer view of one end of the load handler 300. FIG. 3C illustrates the same end of the load handler 300 as that shown in FIG. 3B, with certain components omitted from view. FIG. 3D illustrates an underside view of the same end of the load handler 300 as that shown in FIG. 3B, also with certain components omitted from view. Reference is made among FIGS. 3A-3D, below, which each provides a different view of the load handler 300.

Referring first to FIG. 3A, the lift table 320 includes longitudinal rails 321 and 322 and cross rails 323 and 324. The longitudinal rails 321 and 322 and cross rails 323 and 324 are secured together, at their ends, in an open frame arrangement as illustrated in FIG. 3A. The rails 321-324 can be secured together in any suitable way for sufficient structural integrity, such as using screws, bolts and nuts, clips, brackets, welds, rivets, adhesives, pins and interlocks, mechanical interferences, and other suitable fastening means. The lift pins 331-334 extend up from corners of the lift table 320, and the lift pins 331-334 can be secured at the top surface of the rails 321-324 at the corners using threaded screws or other fastening means. The lift pins 331-334 are designed for a mechanical interface with mating or corresponding features on the underside of a cart, as described below.

The load handler 300 also includes a lift guide linkage that is pivotally secured between the load base 310 and the lift table 320. The lift guide linkage helps to maintain a range of motion for the lift table 320, as it is moves in the direction "A". Particularly, the lift guide linkage maintains or defines the range of motion of the lift table 320 to within a single degree of freedom, so that it extends in a curved motion from a lower or seated position on the top surface of the load base 310 to the lifted or elevated position over the top surface of the load base 310, as illustrated in FIG. 3A. The lift guide linkage also supports the weight of the lift table 320 and any cart resting on the lift table 320, at least in part.

The lift guide linkage includes two pivotable swing guides in the lift table 320 and two complimentary pivotable swing guides in the load base 310. The cross rail 323 of the lift table 320 is omitted from view in FIG. 3C, so that a pivotable swing guide in the lift table 320 is shown. The pivotable swing guide includes a pivoting bar 360, a first radial bearing mount 361, and a second radial bearing mount 362. The pivoting bar 360 extends between the mounts 361 and 362. The mounts 361 and 362 include internal, radial roller bearings, and the pivoting bar 360 is secured and extends between the roller bearings. Thus, the pivoting bar 360 can freely rotate along its longitudinal axis. The lift table 320 includes a similar arrangement of another pivoting bar and radial bearing mounts under the lift pins 333 and 334 (see FIG. 3A).

FIG. 3D illustrates a pivotable swing guide that is positioned within the load base 310. The side panels of the load base 310 are omitted from view in FIG. 3D, so that internal components of the load base 310 are visible. The load base 310 includes an internal frame 390, as shown. The frame 390 of the load base 310 can be formed from any materials of suitable strength, weight, and other characteristics, such as aluminum, steel or other metals, plastic composites, combinations thereof, or other materials.

The pivotable swing guide includes the pivoting bar 367, a first radial bearing mount 368, and a second radial bearing mount (hidden, not shown). The pivoting bar 367 extends between the mount 368 and a mount at the opposite end of the pivoting bar 367. The mount 368 includes an internal, radial roller bearing, and the pivoting bar 367 is secured and extends between roller bearings at both ends. Thus, the pivoting bar 367 can freely rotate along its longitudinal axis. The load base 310 includes a similar arrangement of another pivoting bar and radial bearing mounts toward the transport cab 200 (see FIG. 3A and FIG. 3F).

The pivotable swing guides in the load handler 300 also include a number of swing guide armatures. As shown in FIG. 3A, the load handler 300 includes the swing guide armatures 341-344. The swing guide armatures 341-344 extend between and mechanically couple the load base 310 with the lift table 320, in an arrangement that permits the degree of freedom discussed above. Referring between FIGS. 3C and 3D, the swing guide armature 342, as one example, extends between one end of the pivoting bar 360, next to the radial bearing mount 362, to one end of the pivoting bar 367, at the radial bearing mount 368. The swing guide armature 342 is secured to both the pivoting bar 360 and the pivoting bar 367, respectively, at ends of the swing guide armature 342. The swing guide armatures 341, 343, and 344 are also similarly secured between the pivoting bars in the robotic transport 100. Because the bars 360 and 367 rotate, the lift table 320 can move in a single degree of freedom, in a curved motion from a seated position on the top surface of the load base 310 to the elevated position over the top surface of the load base 310. The motion of the lift table 320 is separately controlled by a lift drive.

Figure 3E:
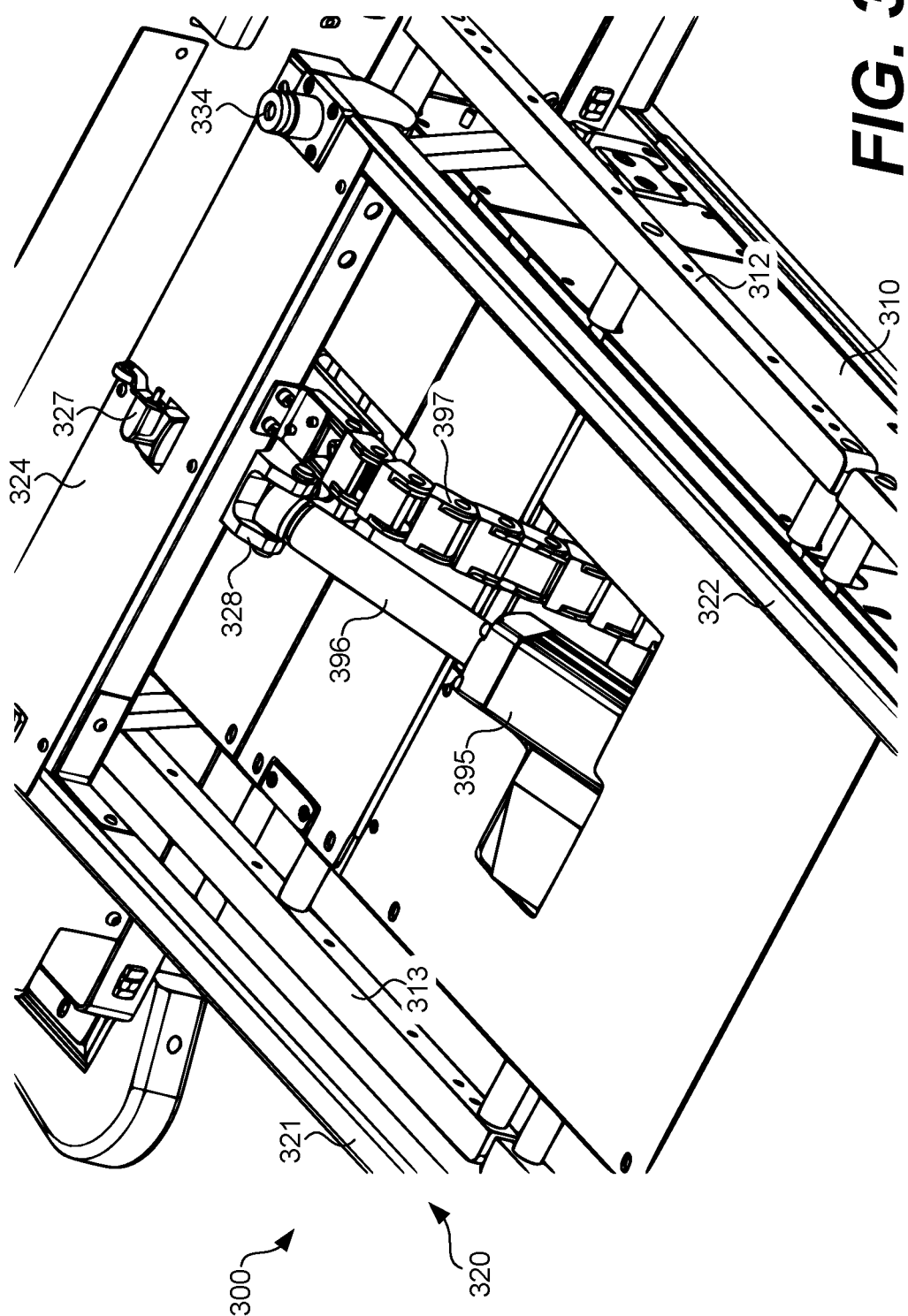
FIG. 3E illustrates a lift drive of the load handler shown in FIG. 2 according to various aspects of the embodiments of the present disclosure.
Figure 3F:
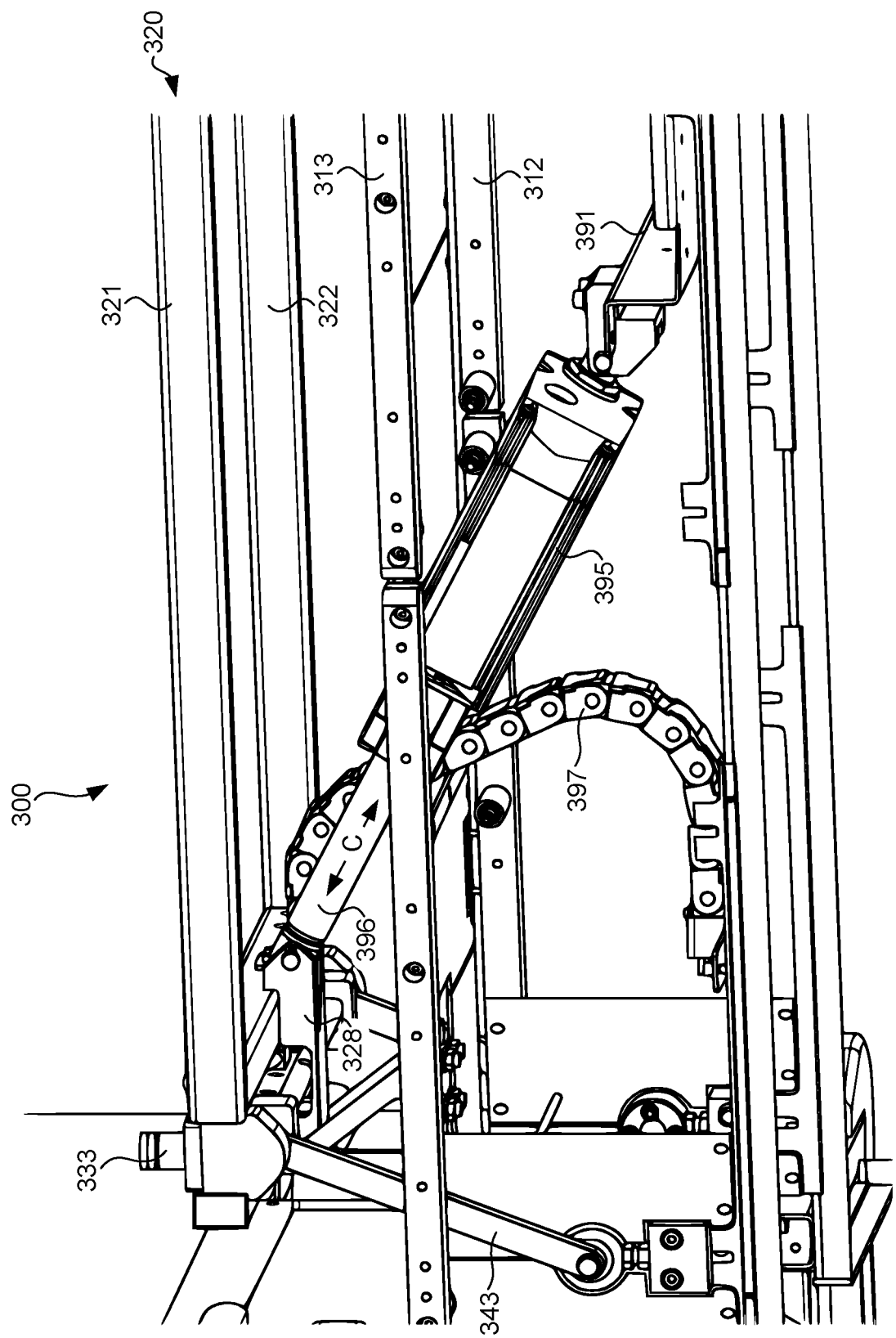
FIG. 3F illustrates a side view of the lift drive according to various aspects of the embodiments of the present disclosure.

FIG. 3E illustrates part of a lift drive 395 extending through an opening in a top of the load handler 300, and FIG. 3F illustrates a side view of the lift drive 395. The side panels of the load handler 300 are omitted from view in FIG. 3F, so that the position and mechanical arrangement of the lift drive 395 is visible within the load handler 300. The lift drive 395 is positioned and secured between the frame mount 391 within the load handler 300, at one end, and the lift drive mount 328 on the lift table 320, at another end, as shown in FIG. 3F. The cable raceway 397 also extends between the load handler 300 and the lift table 320, for routing wires and other control interfaces.

The lift drive 395 is capable of pushing up and lifting the lift table 320, as well as releasing and lowering the lift table 320. As the drive shaft 396 of the lift drive 395 is extended, it pushes the lift drive mount 328 and the lift table 320 up. The pushing forces provided by the lift drive 395 are sufficient to lift both the lift table 320 and any cart that may be positioned above the lift table 320. The control environment 500 can direct the extension and retraction of the lift drive 395, to raise and lift carts, as described herein. The lift drive 395 can provide feedback signals to the control environment 500 during extension. The feedback signals can provide position information, power draw or sink information, and other operational data. The feedback signals can be relied upon, in one example, to calculate the weight of a cart being lifted for transport.

The lift drive 395 can be embodied as a linear actuator in one example, such as a hydraulic, pneumatic, electro-mechanical, or other type of linear actuator. In one example, the lift drive 395 is capable of moving or displacing the drive shaft 396 in the linear direction "C," as shown in FIG. 3F, by pneumatic control. Pneumatic, hydraulic, or other supporting systems for the lift drive 395 can be maintained within the transport cab 200, for example, among other locations. In other examples, the lift drive 395 is capable of converting rotary motion into linear motion in the linear direction "C," using one or more motors, gearboxes, and a leadscrew, ball screw, roller screw, cam, or other mechanical motion translation mechanism.

Referring back to FIG. 3A, the robotic transport 100 also includes a number of bumpers, such as the bumpers 351 and 352, which are positioned at the back side or surface of the transport cab 200. The bumpers 351 and 352 can be embodied as relatively soft rubber, plastic, or other suitable materials. When a cart is lifted by the lift table 320, one or more rails or features of the cart can come into contact with the bumpers 351 and 352, which provide dampening. The bumpers 351 and 352 are illustrated as examples in FIG. 3A. In other cases, the bumpers 351 and 352 can be positioned at other locations, and more bumpers can be relied upon in addition to those shown.

Referring to FIGS. 3B and 3E, the lift table 320 includes a contact sensor 326 positioned at a relative center of the cross rail 323 (FIG. 3B) and a contact sensor 327 positioned at a relative center of the cross rail 324 (FIG. 3E). The contact sensors 326 and 327 can be embodied as contact switches, for example, or other sensors capable of identifying when the lift table 320 is proximate to or makes contact with the underside of a cart. Thus, in addition to the use of the other sensors described herein, the control environment 500 can rely upon feedback signals from the contact sensors 326 and 327 to determine when a cart is present on the lift table 320.

Referring to FIG. 3C, the lift table 320 includes support bridges 363 and 364, and the load base 310 includes support pads 365 and 366. The support bridges 363 and 364 can be formed from metal, plastic, or other materials, and the pivoting bar 360 extends through an aperture or opening in the support bridges 363 and 364. The support pads 365 and 366 can be formed from metal, plastic, or other materials and provide a contact surface for the support bridges 363 and 364. When the lift table 320 is lowered and resting upon the load base 310, the support bridges 363 and 364 rest upon the support pads 366 and 365, respectively.

Additionally, the load base 310 includes a lift abutment anchor 370 secured at or on a top surface of the load base 310. The lift abutment anchor 370 helps to align and seat the lift table 320, particularly when it is raised to the lifted position. For that purpose, the lift table 320 also includes a centering abutment guide 371, which is secured at a relative center of the cross rail 323 (see FIG. 3B). The centering abutment guide 371 seats into a bumper 372 of the lift abutment anchor 370 when the lift table 320 is raised to the lifted position. The load base 310 includes a similar lift abutment anchor at the other end of the lift table 320.

To direct the movement of the robotic transport 100, the load base 310 includes a directable caster wheel 381, as shown in FIG. 3D. The directable caster wheel 381 can be secured to the frame 390 of the load base 310, along with other components of the load base 310. The directable caster wheel 381 includes one or more motors, gears, and couplings that facilitate the ability to control the angular orientation or direction of the wheel 381. The control environment 500 can direct the rotary position or orientation of the directable caster wheel 381, for example, to enable particular and directed movements of the robotic transport 100 in connection with the main drive system of the robotic transport 100.

Figure 3G:
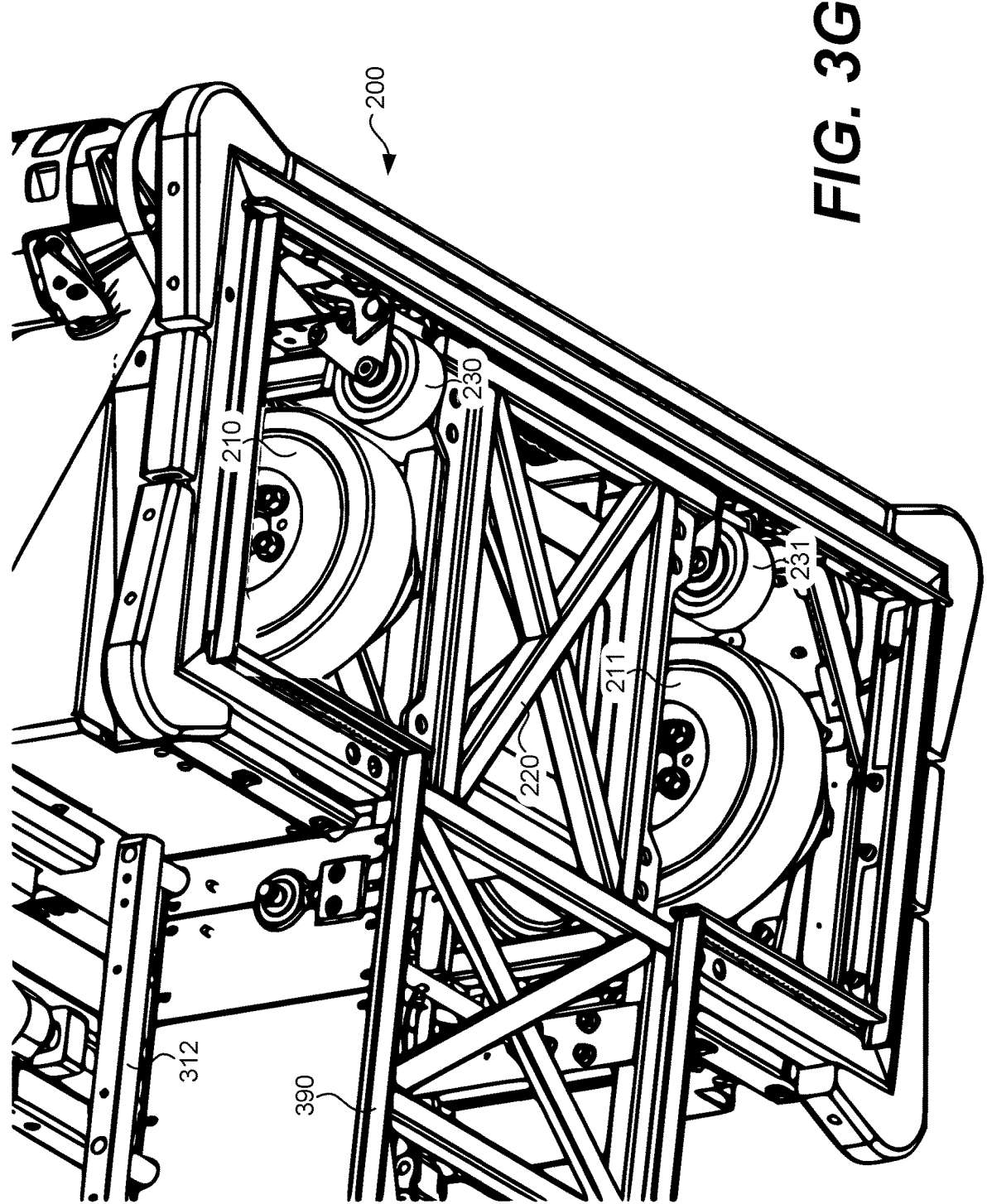
FIG. 3G is an underside view of the transport cab of the robotic transport shown in FIG. 2 according to various aspects of the embodiments of the present disclosure.

The main drive system of the robotic transport 100 is shown in FIG. 3G. In the example shown, the main drive system includes the drive wheel 210 and the drive wheel 211, which are both secured to a frame 220 of the transport cab 200. The drive wheels 210 and 211 are coupled with drive motors capable of driving rotation of the drive wheels 210 and 211. The drive motors can rotate the drive wheels 210 and 211, respectively and independently. The control environment 500 can direct the operation of the drive motors for the drive wheels 210 and 211. The drive wheels 210 and 211 can provide a type of differential drive system for the robotic transport 100, based on control signals provided from the control environment 500. The control signals can maneuver the robotic transport 100, based on control algorithms executed by the robotic automation engine 520.

In some cases, the drive wheels 210 and 211 can be embodied as a holonomic drive system, in which the drive wheels 210 and 211 are capable of rotating to change orientation, before spinning to reposition the robotic transport 100. In that case, the holonomic drive system of the robotic transport 100 can facilitate the immediate movement of the robotic transport 100 in any direction, without the robotic transport 100 itself spinning or turning about an axis formed between differential drive wheels. Thus, the drive system illustrated in FIG. 3G is provided as an example, and other types of drive systems can be relied upon.

In addition to the active drive system, the robotic transport 100 includes tow or passive drive wheels. For example, as shown in FIG. 3G, the passive drive wheels 230 and 231 are typically maintained in a retracted or elevated position, without making ground contact. However, the passive drive wheels 230 and 231 can be extended and lowered down, using a bolt or other extension means, lifting the drive wheels 210 and 211 of the transport cab 200 off of the ground. Additionally, as shown in FIG. 3B, the robotic transport 100 can include a passive drive wheel 380 on one side of the handler sensor array 450. The robotic transport 100 can also include another passive drive wheel on another side of the handler sensor array 450, although it is not visible in FIG. 3B. The passive drive wheel 380 can also be maintained in a retracted or elevated position, without making ground contact. However, the passive drive wheel 380 can be extended and lowered down, using a bolt or other extension means, lifting the load base 310 off of the ground. The passive or tow wheels of the robotic transport 100 can be relied upon to reposition the robotic transport 100 in the event of mechanical or system failure, depleted battery, or other condition.

The robotic transport 100 can also include a battery bank, a wireless charging module, power converters, and other components of a power system. The battery bank can be embodied as any suitable battery bank, including one or more sealed lead acid, lithium ion, nickel metal hydride, or other battery technologies, along with a power converter to charge and discharge the battery bank. The battery bank can be distributed among the transport cab 200 and the load handler 300 in some cases or located only in one of the transport cab 200 or the load handler 300. The battery bank can supply power to the drive wheels 210 and 211, the control environment 500, sensors, and other components of the robotic transport 100. The wireless charging module can be embodied as a wireless inductive charger for charging the battery bank. Thus, the robotic transport 100 can be easily recharged without the need for a direct bare-conductor connection to a power source.

Figure 4A:
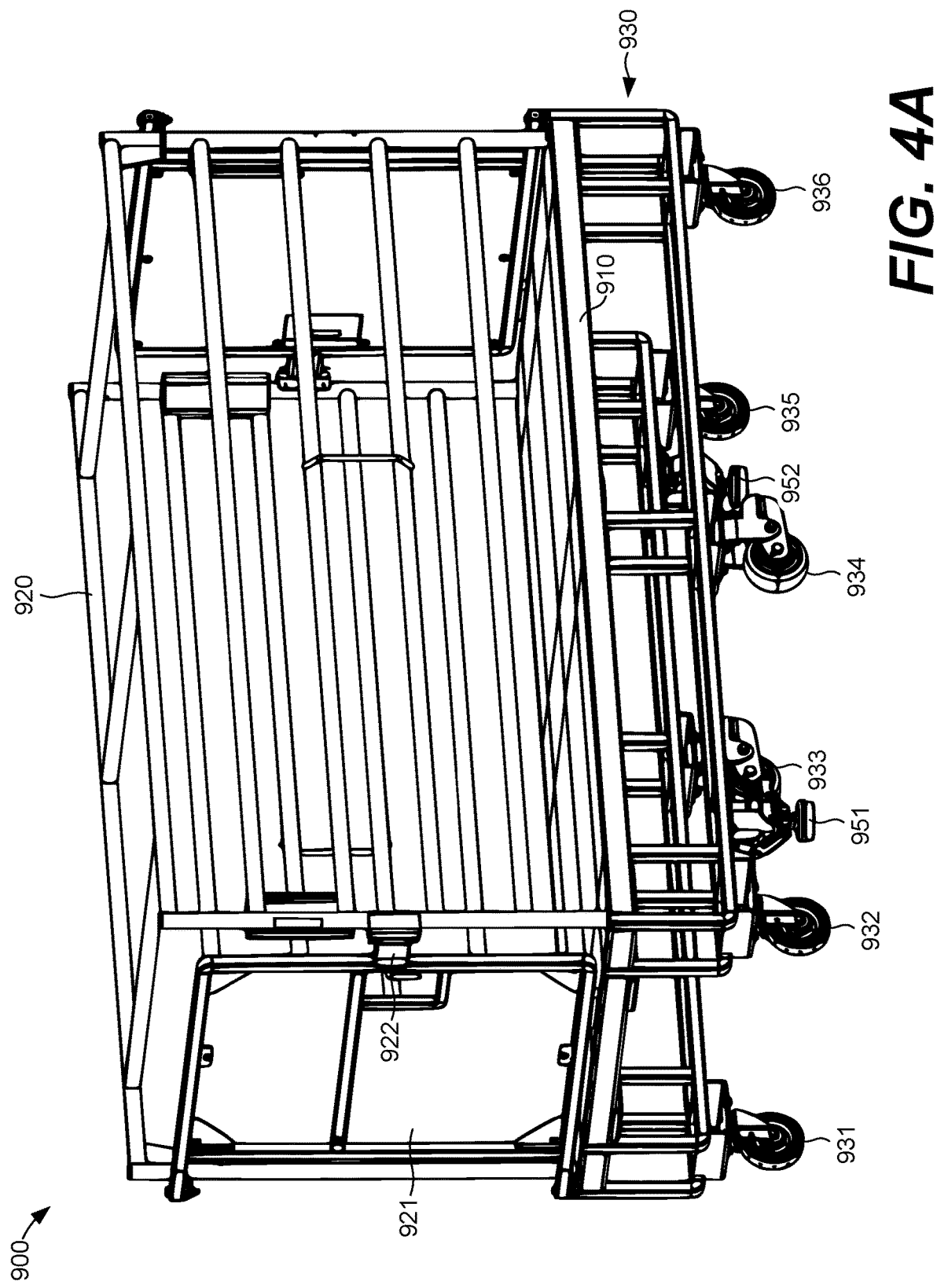
FIG. 4A illustrates a perspective view of an example cart according to various aspects of the embodiments of the present disclosure.
Figure 4B:
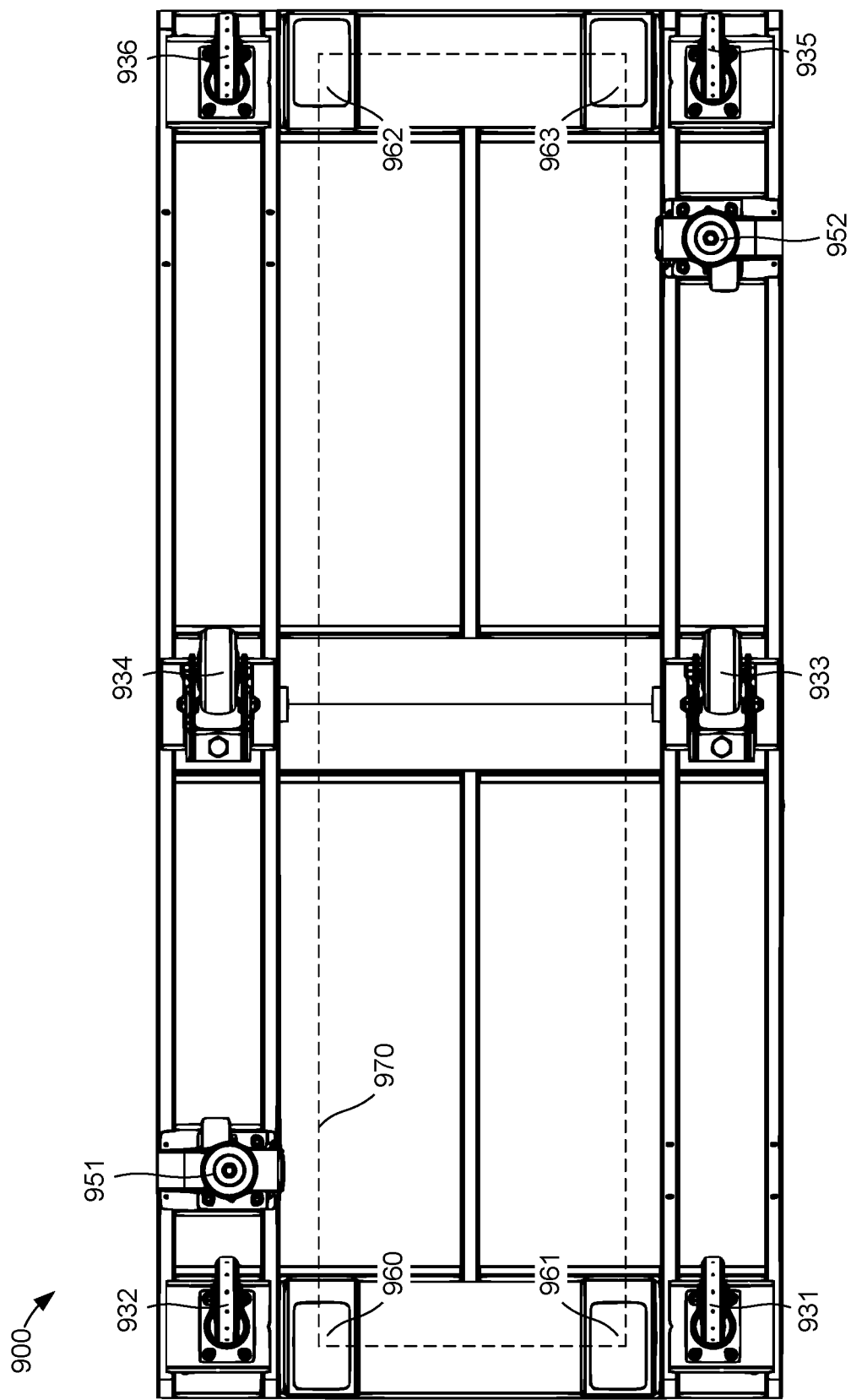
FIG. 4B illustrates a bottom view of the cart shown in FIG. 4A according to various aspects of the embodiments of the present disclosure.

FIG. 4A illustrates a perspective view of an example cart 900, and FIG. 4B illustrates a bottom view of the cart 900 according to various aspects of the embodiments of the present disclosure. The cart 900 can be autonomously transported by the robotic transport 100, but the cart 900 can also be transported by other autonomous robotic systems and individuals when necessary. The cart 900 is provided as a representative example in FIGS. 4A and 4B. The cart 900 is not drawn to any particular scale, and the cart 900 can range in size and dimensions, as needed for the implementation. Additionally, one or more of the components of the cart 900, as illustrated and described herein, can be omitted, and the cart 900 can also include other components not shown in some cases.

Among other components, the cart 900 includes a cart platform 910, a cart cage 920 mounted around the cart platform 910, and a roller pedestal 930 that supports the cart platform 910. The cart 900 can be formed from a range of suitable materials, including a combination of metal, plastic, composite, or other bar, tube, rail, and sheet stock, rubber, wood, combinations thereof, and other materials, without limitation to any particular materials. The cart 900 can be assembled together with a range of suitable mechanical fasteners, including screws, bolts and nuts, welds, rivets, adhesives, pins and interlocks, mechanical interferences, and other suitable fastening means, without limitation to any particular fastening solutions.

A number of items, packages, parcels, and other materials can be placed, stored, and secured within the cart cage 920, for transport. Items can be placed into the cart 900 through the relatively large openings in the top of the cart cage 920, through the door 921 of the cart cage 920, or in other ways. Among other components, the cart cage 920 includes the door 921 and a door latch 922. The cart cage 920 can include similar door and latch features on the other side of the cart cage 920.

The roller pedestal 930 includes a number of wheels 931-936, among others, as shown in FIG. 4A. The wheels 931-936 can be embodied as casters in one example. In some cases, one or more of the wheels 931-936 can include brake mechanisms. The brake mechanisms can prevent the wheels 931-936 from rotating in certain operating configurations. The cart 900 also includes brake or lift arms 951 and 952, which can also be relied upon to brake the cart 900. In one example, the brake or lift arms 951 and 952 can be actuated and released with downward pressure provided on individual levers by the foot of an individual.

In FIG. 4B, a number of recesses 960-963 are shown in the bottom of the cart 900. The recesses 960-963 can be embodied as recessed areas (e.g., of between about ¼ to 2 inches deep) under the cart 900. Each of the recesses 960-963 can be between about 1 to 5 inches in length and between about 1 to 5 inches in width, as one example, although the recesses 960-963 can be other sizes. The recesses 960-963 can be located at other positions under the cart 900, as FIG. 4B is provided as a representative example.

Overall, the positions of the recesses 960-963 coincide or correspond to the positions of the lift pins 331-334 of the lift table 320 (see FIG. 3A). An example outline 970 is also shown in FIG. 4B. The outline 970 is representative of the peripheral size of the lift table 320 of the robotic transport 100. When the load handler 300 of the robotic transport 100 is positioned under the cart 900, the lift pins 331-334 of the lift table 320 can be positioned within the peripheral boundaries of the recesses 960-963, or close to that shown in FIG. 4B. From this position, the lift table 320 can be lifted, and the lift pins 331-334 can seat securely into the recesses 960-963. Thus, the recesses 960-963 help to securely maintain the lift pins 331-334 in place, based on a mechanical interference, when the cart 900 is lifted by the robotic transport 100.

Figure 5A:
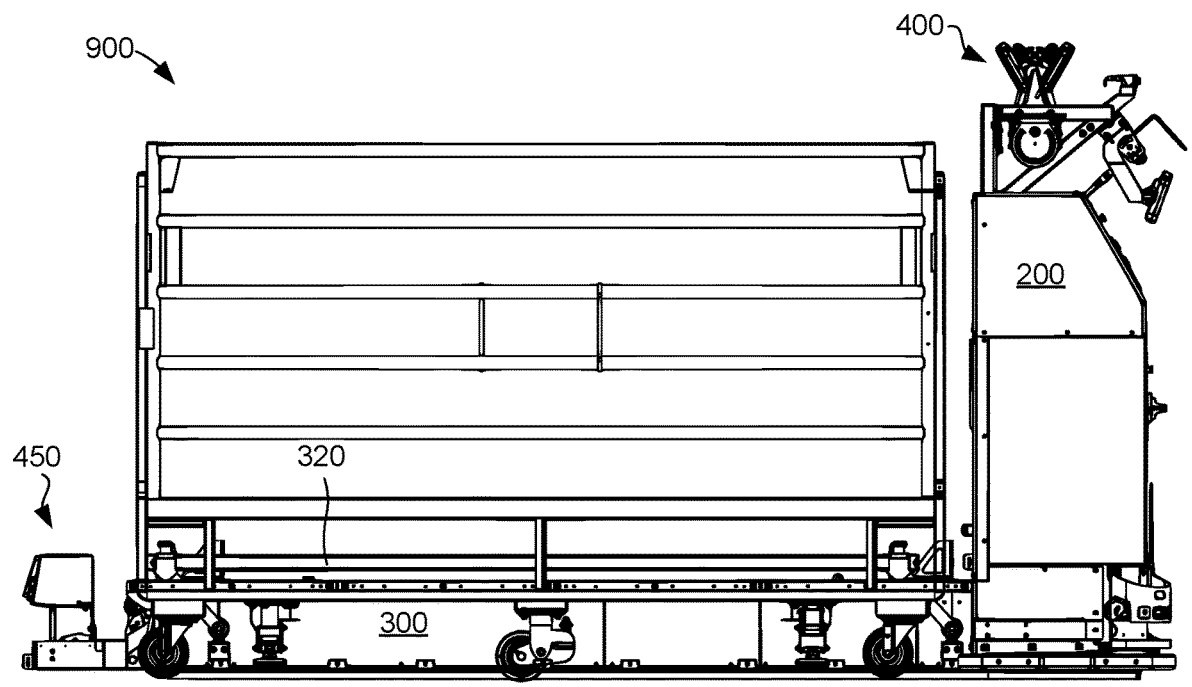
FIGS. 5A and 5B illustrate an example alignment and lift of a cart by the robotic transport shown in FIG. 2 according to various aspects of the embodiments of the present disclosure.

FIG. 5A illustrates an example alignment of the robotic transport 100 shown in FIG. 2 and the cart 900 shown in FIG. 4A. The robotic automation engine 520 of the robotic transport 100 can direct the drive system of the robotic transport 100 into the alignment shown in FIG. 5A, based on feedback obtained from the sensor array 400, the handler sensor array 450, and other data. Particularly, the robotic automation engine 520 can tunnel the load handler 300 under the cart 900. In FIG. 5A, the cart 900 is still resting on the ground, with the load handler 300 positioned under the cart 900, and the lift table 320 in the lowered position. In some cases, the cart 900 can include one or more fiducials printed or otherwise positioned on the underside of the cart 900, to assist the robotic automation engine 520 with accuracy in positioning.

The load handler 300 is designed to have dimensions small enough to permit a mechanical clearance between the load handler 300 and an open channel between the wheels of the cart 900. The cart 900 can also be designed for this clearance. Thus, the control environment 500 can direct the main drive system of the robotic transport 100 to slide or tunnel the load handler 300 underneath the cart 900, such as between wheels of the cart, using operational feedback data from the upper sensor array 400, the handler sensor array 450, and possibly other sensors and other operational data. The bumper rails 312 can facilitate this sliding or tunneling, by providing surfaces for incidental contact with structural features under the cart, as the load handler 300 is extended and tunnels under the cart.

Figure 5B:
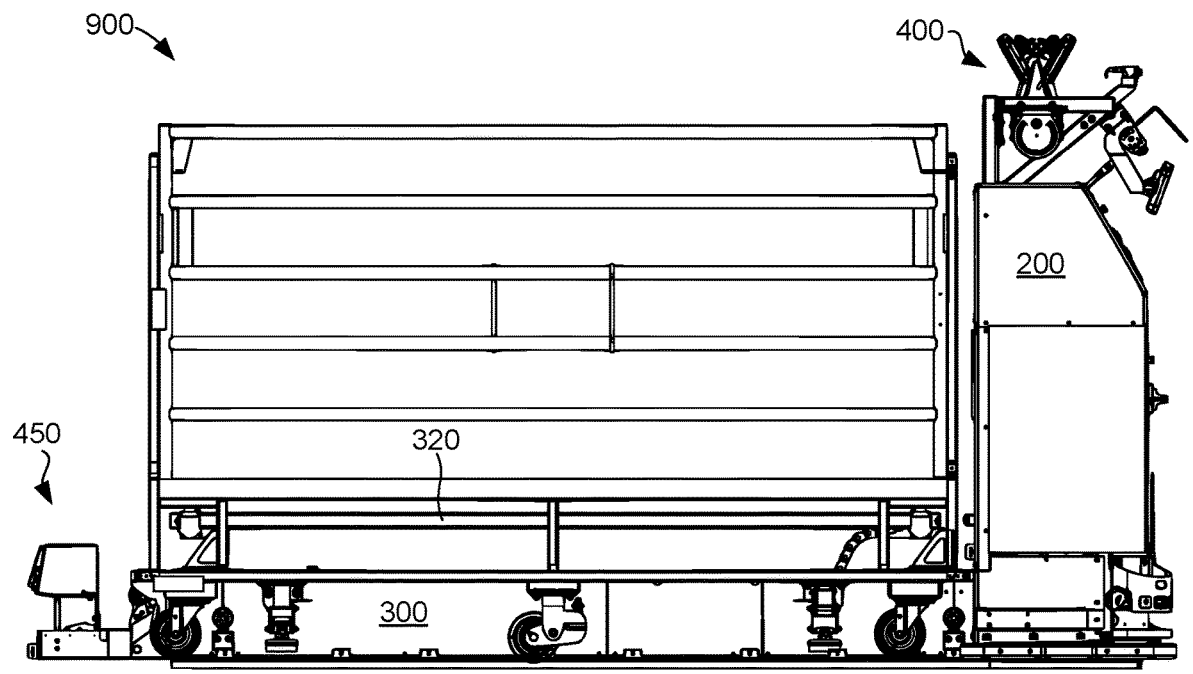

Turning to FIG. 5B, with the load handler 300 positioned under the cart 900, the robotic transport 100 can actuate the lift drive 395, as described above with reference to FIGS. 3E and 3F. The lift drive 395 is capable of raising the lift table 320, and the lift table 320 will contact the underside of the cart 900. In turn, the cart 900 will be lifted, with the cart resting upon the lift table 320. The wheels of the cart 900 will also be lifted off the ground as part of this lifting motion, so that no parts of the cart 900 are contacting the ground. Mechanical interferences or interlocks between the lift pins 331-334 of the lift table 320 and the recesses 960-963 under the cart 900 can help to maintain the cart 900 in a secure position over the robotic transport 100. The cart 900 can also be lowered back down and off of the load handler 300 in a similar way, by reversing the operation of the lift drive 395.

Figure 6:
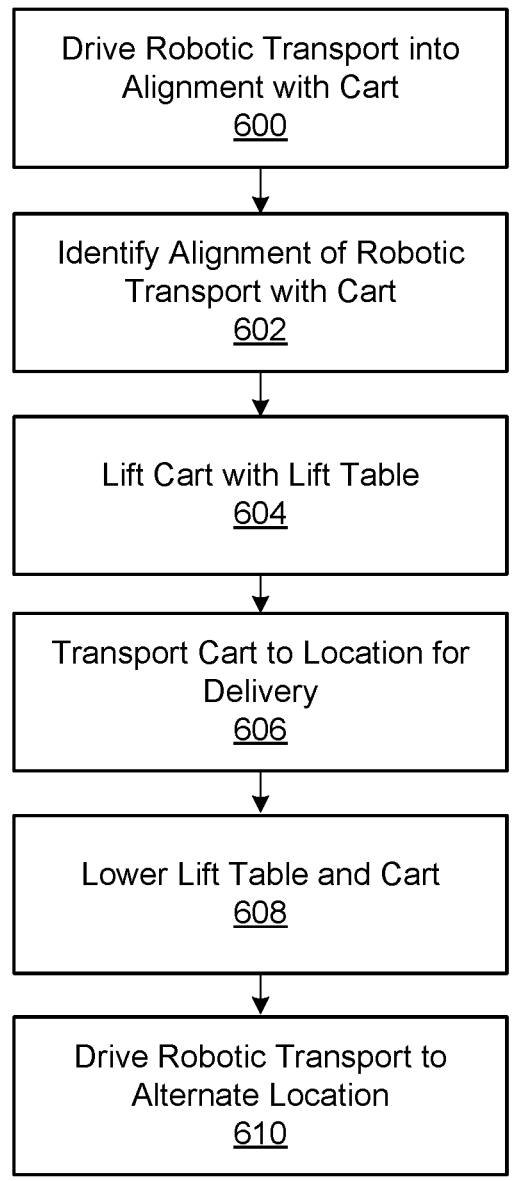
FIG. 6 illustrates an example method of cart transport using the robotic transport shown in FIG. 2 according to various aspects of the embodiments of the present disclosure.

FIG. 6 illustrates an example method of cart transport using the robotic transport 100 shown in FIG. 2. The process shown in FIG. 6 is described in connection with the robotic transport 100, although related or similar robotic transports can perform the process. Although the process diagram shows an order of operation, the order can differ from that which is shown. For example, the order of two or more steps can be switched relative to the order shown or as described below. Also, two or more steps shown in succession can be executed concurrently or with partial concurrence. Further, in some examples, one or more of the steps can be skipped or omitted, and the process can continue on with additional steps for any period of time.

At step 600, the process includes the robotic automation engine 520 directing the drive system of the robotic transport 100 to drive into alignment with a cart, such as the cart 900 shown in FIG. 4A. Here, the robotic automation engine 520 can use image, radar, LIDAR, and other feedback data from the sensor array 400, a handler sensor array 450, and other sensors of the robotic transport 100 as input for computer-vision algorithms suitable for directing the robotic transport 100. In some cases, one or more fiducials or other markers can be placed at suitable locations on or under the cart 900, for example, to help in steering control. As part of this alignment process, the control environment 500 can direct the main drive system of the robotic transport 100 to slide or tunnel the load handler 300 underneath the cart 900, such as between wheels of the cart, as shown in FIG. 5A.

At step 602, the process includes the robotic automation engine 520 identifying alignment of the robotic transport 100 with the cart 900. The robotic automation engine 520 can identify when the lift pins 331-334 of the lift table 320 are aligned sufficiently with the recesses 960-963 under the cart 900, using computer-vision algorithms or other suitable techniques. In some cases, the cart 900 can include one or more fiducials printed or otherwise positioned on the underside of the cart 900, to assist the robotic automation engine 520 with accuracy in positioning.

At step 604, the process includes the robotic transport 100 lifting the cart 900. For example, the robotic automation engine 520 can direct the lift drive 395 to lift or raise the lift table 320 based on extension of the drive shaft 396 of the lift drive 395, as also described above with reference to FIGS. 3E and 3F. The lift table 320 will contact the underside of the cart 900 as part of this lifting motion. In turn, the cart 900 will be lifted, with the cart resting upon the lift table 320. The wheels of the cart 900 will also be lifted off the ground as part of this lifting motion, so that no parts of the cart 900 are contacting the ground. Mechanical interferences or interlocks between the lift pins 331-334 of the lift table 320 and the recesses 960-963 under the cart 900 can help to maintain the cart 900 in a secure position over the robotic transport 100.

At step 606, the process includes transporting the cart 900 using the robotic transport 100. For example, the robotic automation engine 520 can direct the drive system of the robotic transport 100 to relocate the cart 900 to any suitable location. At step 608, the process includes the robotic transport 100 lowering the cart 900. Here, the robotic automation engine 520 can direct the lift drive 395 to lower the cart 900, by reversing the extension of the lift drive 395, as also described above with reference to FIGS. 3E and 3F.

At step 610, the process includes the robotic automation engine 520 identifying that the cart 900 has been lowered down onto the ground and guiding the robotic transport 100 away from the cart 900. For example, the robotic automation engine 520 can cause the robotic transport 100 to travel in a reverse direction away from the cart 900 until the robotic transport 100 is outside the proximity of the cart 900 to allow the robotic transport 100 to move to another location without interference of the cart 900. Once the robotic transport 100 has moved away from the cart 900, the robotic automation engine 520 can direct the robotic transport 100 to drive to another location.

Figure 7:
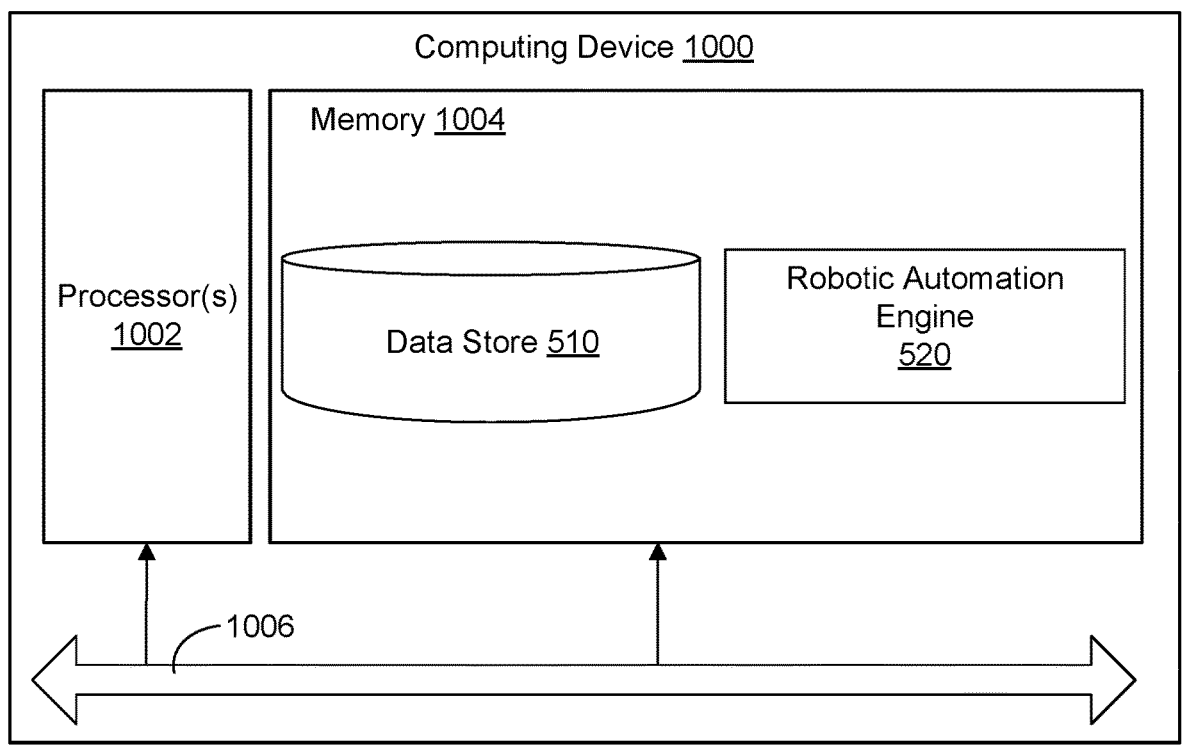
FIG. 7 illustrates an example computing device for the robotic transport shown in FIG. 2 according to various aspects of the embodiments of the present disclosure.

FIG. 7 illustrates an example computing device 1000 for the robotic transport 100 according to various aspects of the embodiments of the present disclosure. The control environment 500, as shown in FIG. 2, can be implemented in the computing device 1000, using hardware, software, or a combination of hardware and software. As shown in FIG. 7, the computing device 1000 includes at least one processing system, for example, having a processor 1002 and a memory 1004, both of which are electrically and communicatively coupled to a local interface 1006. The local interface 1006 can be embodied as a data bus with an accompanying address/control bus or other addressing, control, and/or command lines, for data communications and addressing between the processor 1002, the memory 1004, network interfaces, the sensors described herein, and other peripherals and systems.

In various embodiments, the memory 1004 stores the data in the data store 510, automation data, and other software or executable-code components executable by the processor 1002. The memory 1004 can store data related to the operation of the robotic transport 100, the sensors described herein, and other data in the data store 510. Among others, the executable-code components can include components associated with the robotic automation engine 820 and an operating system for execution by the processor 1002. Where any component discussed herein is implemented in the form of software, any one of a number of programming languages can be employed such as, for example, C, C++, C#, Objective C, JAVA® JAVASCRIPT®, Perl, PHP, VISUAL BASIC®, PYTHON®, RUBY, FLASH®, or other programming languages.

The memory 1004 stores software for execution by the processor 1002. In this respect, the terms "executable" or "for execution" refer to software forms that can ultimately be run or executed by the processor 1002, whether in source, object, machine, or other form. Examples of executable programs include, for example, a compiled program that can be translated into a machine code format and loaded into a random access portion of the memory 1004 and executed by the processor 1002, source code that can be expressed in an object code format and loaded into a random access portion of the memory 1004 and executed by the processor 1002, or source code that can be interpreted by another executable program to generate instructions in a random access portion of the memory 1004 and executed by the processor 1002.

In various embodiments, the memory 1004 can include both volatile and nonvolatile memory and data storage components. Volatile components are those that do not retain data values upon loss of power. Nonvolatile components are those that retain data upon a loss of power. Thus, the memory 1004 can include, a random access memory (RAM), read-only memory (ROM), magnetic or other hard disk drive, solid-state or semiconductor memory, a universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 1004.

The processor 1002 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the robotic automation engine 820 can represent a module or group of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. Thus, the processor 1002 can be directed by execution of the program instructions to perform certain processes, such as those illustrated in FIG. 6. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 1002. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowchart or process diagram in FIG. 6 is representative of certain processes, functionality, and operations of the embodiments discussed herein. Each block can represent one or a combination of steps or executions in a process. Alternatively, or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 1002. The machine code can be converted from the source code, etc. Further, each block can represent, or be connected with, a circuit or a number of interconnected circuits to implement a certain logical function or process step.

Although the flowchart or process diagram in FIG. 6 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A robotic cart transport system, comprising:
    a cart for transport of items; and
    a robotic transport comprising a transport cab and a load handler extending from one side from the transport cab, wherein:
    the transport cab comprises a drive system and a sensor array positioned over the transport cab; and
    the load handler comprises:
        a load base supported by a directable caster wheel;
        bumper rails that extend along sides of the load base;
        a lift table positioned over the load base;
        a lift guide linkage pivotally secured between the load base and the lift table, the lift guide linkage maintaining a range of motion for the lift table to lift the cart;
        a lift abutment anchor secured to a top surface of the load base; and
        a lift drive configured to raise the lift table from a lower position on the top surface of the load base to a lifted position seated against the lift abutment anchor.

2. The robotic cart transport system according to claim 1, wherein the lift drive comprises a linear actuator mechanically coupled between a frame of the load base and the lift table.

3. The robotic cart transport system according to claim 1, wherein the lift guide linkage comprises a first pivotable swing guide in the lift table, a second pivotable swing guide in the load base, and swing guide armatures secured and extending between the first pivotable swing guide and the second pivotable swing guide.

4. The robotic cart transport system according to claim 1, wherein the lift table comprises an open frame, lift pins, a first centering abutment guide, a second centering abutment guide, support contacts, a lift drive mount, and contact sensors.

5. A robotic transport, comprising:
    a load base;
    a lift table positioned over the load base, wherein the lift table comprises lift pins and a centering abutment guide;
    a lift guide linkage pivotally secured between the load base and the lift table; and
    a lift drive configured to raise the lift table from a lower position to a lifted position.

6. The robotic transport according to claim 5, further comprising:
    a lift abutment anchor secured to a top surface of the load base, wherein:
    the lift drive is configured to raise the lift table from the lower position to a lifted position seated against the lift abutment anchor.

7. The robotic transport according to claim 5, wherein the lift guide linkage maintains a range of motion for the lift table to a curved motion extending from the lower position on a top surface of the load base to the lifted position over the top surface of the load base.

8. The robotic transport according to claim 5, wherein the lift drive comprises a linear actuator mechanically coupled between a frame of the load base and the lift table.

9. The robotic transport according to claim 5, wherein the lift guide linkage comprises a first pivotable swing guide in the lift table, a second pivotable swing guide in the load base, and swing guide armatures secured and extending between the first pivotable swing guide and the second pivotable swing guide.

10. The robotic transport according to claim 5, wherein the lift table comprises support bridges, a lift drive mount, and contact sensors.

11. The robotic transport according to claim 5, further comprising a transport cab, the transport cab comprising a drive system and at least one battery.

12. The robotic transport according to claim 11, wherein the drive system comprises a holonomic drive system.

13. The robotic transport according to claim 5, wherein the load base comprises a directable caster wheel.

14. The robotic transport according to claim 5, further comprising:
 a sensor array; and
 a control environment configured to direct operation of the robotic transport based at least in part on feedback data from the sensor array.

15. A method of robotic transport, comprising:
 driving a robotic transport into alignment with a cart, wherein the robotic transport comprises:
   a load base;
   a lift table positioned over the load base, wherein the lift table comprises lift pins and a centering abutment guide;
   a lift guide linkage pivotally secured between the load base and the lift table; and
   a lift drive configured to raise the lift table from a lower position to a lifted position.

16. The method according to claim 15, further comprising the robotic transport identifying alignment of the lift table with the cart.

17. The method according to claim 16, further comprising the lift drive lifting the cart with the lift table.

18. The method according to claim 17, further comprising the robotic transport transporting the cart to a different location.

19. The method according to claim 18, further comprising the lift drive lowering the lift table and the cart.

20. The robotic transport of claim 5, further comprising bumper rails that extend along sides of the load base.

* * * * *